July 4, 1950     W. P. SCHMITTER     2,514,262
IDLER MOUNTING FOR BEVEL TYPE REVERSING GEARING
Filed June 3, 1949     3 Sheets-Sheet 3

INVENTOR.
Walter P. Schmitter
BY
Charles French
Attorneys

Patented July 4, 1950

2,514,262

UNITED STATES PATENT OFFICE 2,514,262

IDLER MOUNTING FOR BEVEL TYPE REVERSING GEARING

Walter P. Schmitter, Wauwatosa, Wis., assignor to The Falk Corporation, Milwaukee, Wis., a corporation of Wisconsin Application June 3, 1949, Serial No. 96,918

2 Claims. (Cl. 74—379)

1

The invention relates to power transmissions and more particularly to reversible power transmissions including bevel gearing for effecting a reverse.

The main object of the present invention is to improve the bevel gear drive of reversible power transmissions such as shown, for example, in my prior U. S. Patent No. 2,304,030, dated December 1, 1942, the present invention being directed to an improved arrangement for securing a floating mounting for the idler bevel gears that during reverse transmit the power from a drive bevel gear to a bevel gear on the driven shaft, said drive bevel gear being clutch controlled so that it only drives for the reverse drive of the driven shaft.

The invention further consists in the several features hereinafter described and more particularly defined by claims at the conclusion hereof.

Figure 1:
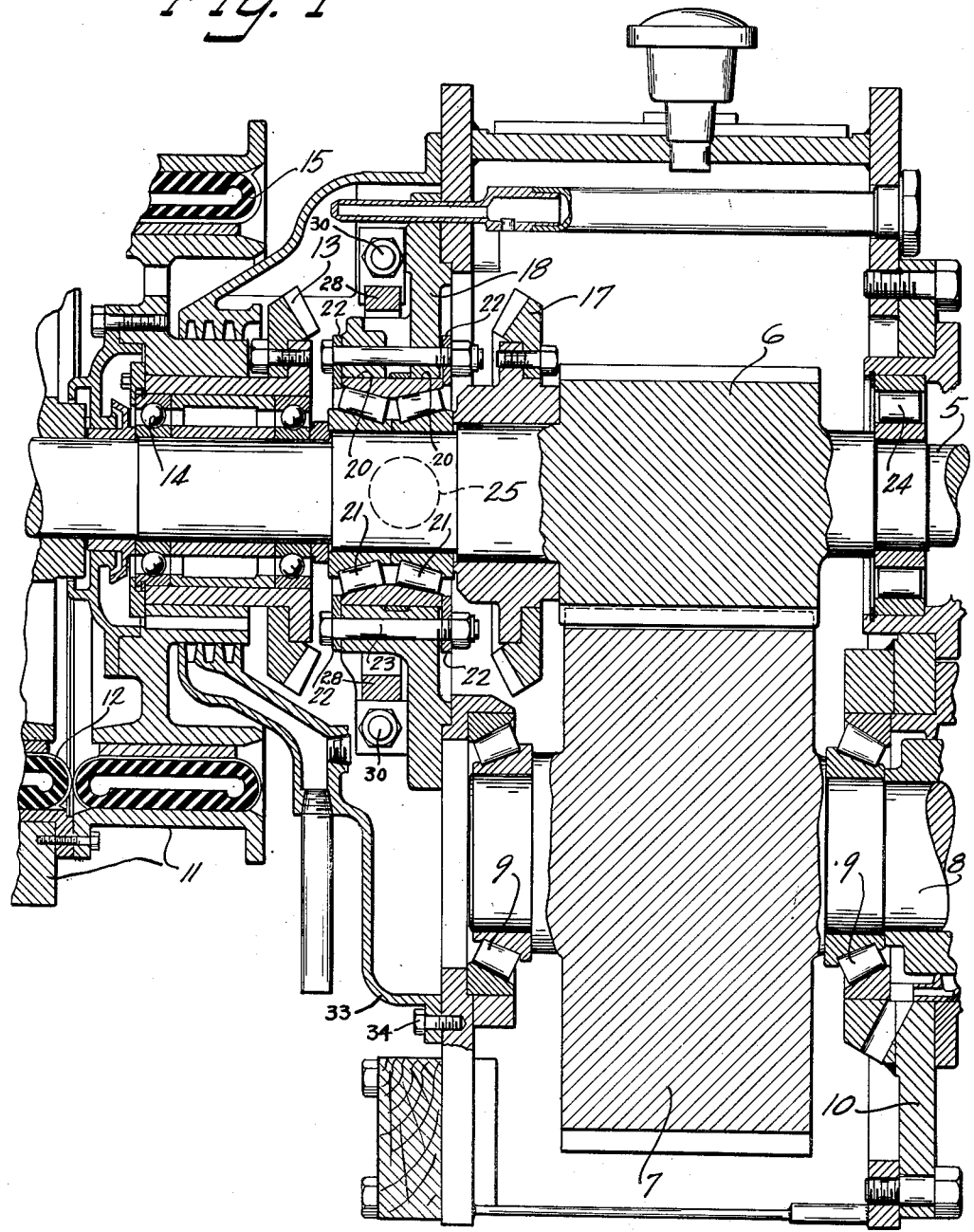
Fig. 1 is a vertical sectional view of a power transmission including gearing embodying the invention.

Referring to Fig. 1, the numeral 5 designates a shaft having a gear 6 formed integral therewith or secured thereto meshing with a larger gear 7 on a driven shaft 8 journalled in bearings 9 in a housing 10. As in said prior patent above referred to, a drive shaft (not shown in detail) but including a part 11 is adapted to be connected by a clutch 12 to the shaft 5 for direct drive of said shaft and a consequent drive of the shaft 8 at a reduced speed. As also shown in said patent, a bevel gear 13 is mounted on bearings 14 surrounding the shaft 5, which gear may be connected to the part 11 of the drive shaft through a clutch 15, said gear 13 meshing with bevel gears 16 that also mesh with a bevel gear 17, keyed or otherwise fixed to the shaft 5, so that when said gear 13 is connected by clutch 15 with the drive shaft, the shaft 5 will be given a reverse rotation so that the shaft 8 will be driven in reverse. Thus the shaft 5 may be considered a reversible drive shaft for driving the shaft 8 at a reduced speed in either a forward or reverse direction, as for example, in propeller shaft marine drives.

The present invention relates particularly to

2 the improved mounting of the bevel gears 16 in driving relation with the gears 13 and 17 and an improved bearing mounting for the shaft 5.

Figure 2:
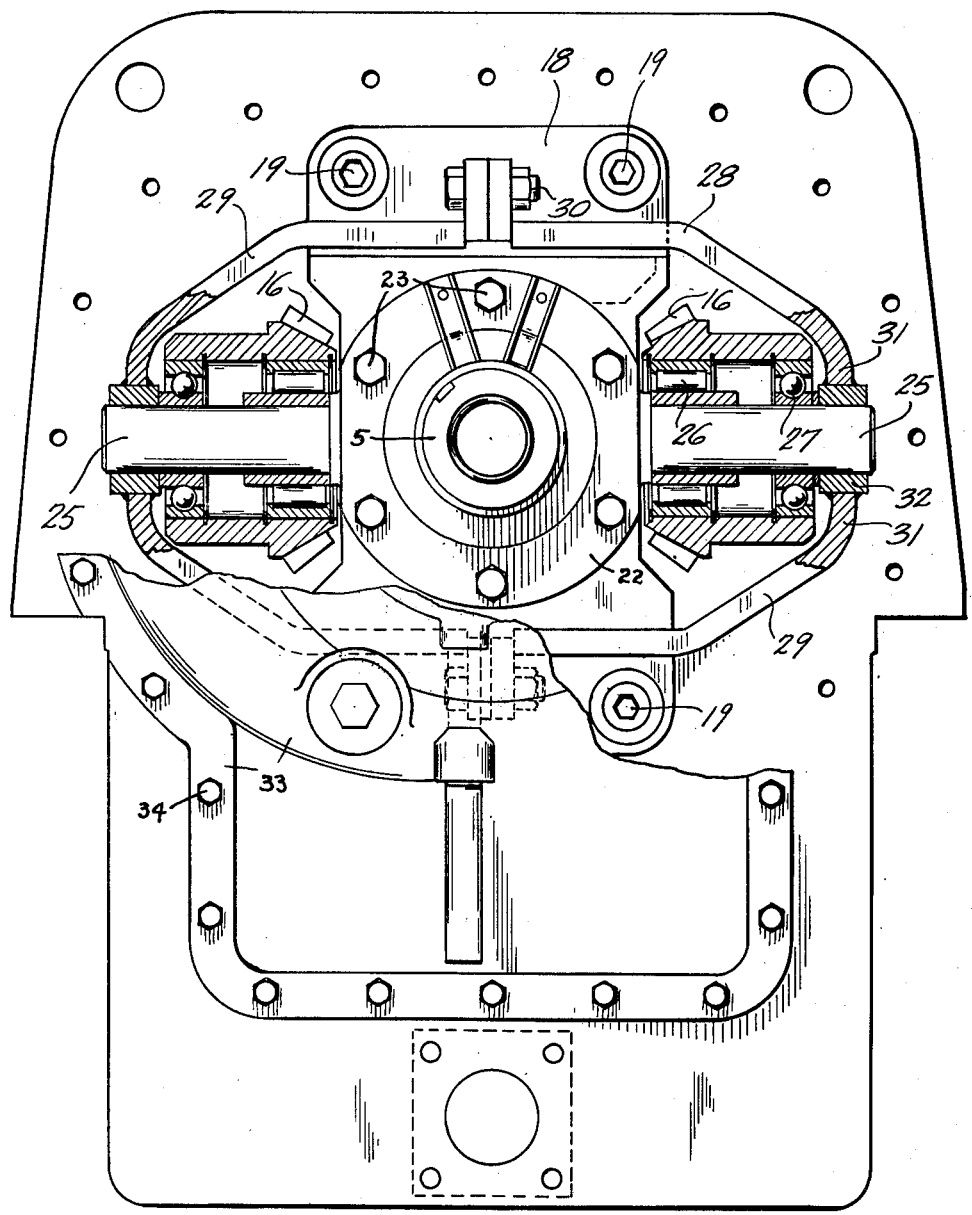
Fig. 2 is a vertical sectional view taken generally along the line 2—2, parts being broken away and parts being shown in section, other parts in front at the lower portion of said figure being shown in full.
Figure 3:
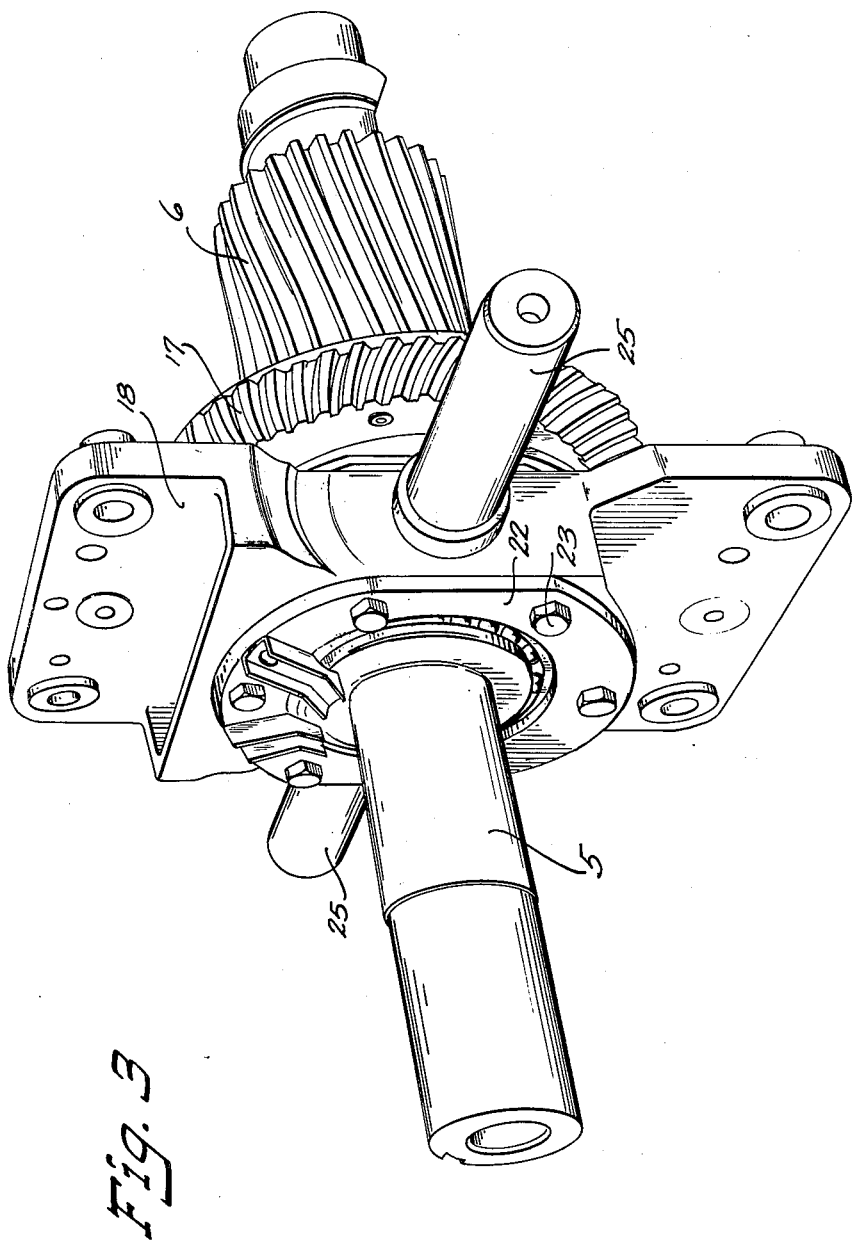
Fig. 3 is a perspective view of parts of the gearing embodying the invention.

Referring to Figs. 2 and 3, a spider or gear carrier 18 is bolted at its top and bottom at 19 to the front side of the housing 10 and has a central opening 20 in which a tapered double roller thrust bearing 21 has its upper race secured between annular clamping plates 22 by bolts 23.

The shaft 5 is mounted in the lower race of the bearing 21 which provides a bearing support of considerable length between the gears 13 and 17 as compared to said Patent No. 2,304,030. The other end of the shaft 5 is mounted in a plain roller bearing 24.

The carrier 18 has stud shafts 25 at opposite sides and formed integral with it and on each of which a bevel gear 16 is mounted on spaced roller and ball bearings 26 and 27, respectively, which are free to slide on the stud shaft 25.

A thrust compensating or equalizing yoke 28 formed of yoke sections 29 whose angled ends are secured together by bolts 30 extends loosely over or straddles parts of the carrier 18, and the arms 31 of each section are secured to a boss or central portion 32 which is apertured to receive the outer end of its associated stud shaft 25 upon which it is loosely slidably mounted. The bearings 27 of the gears 16 have end thrust engagement with the bosses 32. Thus if during the operation a thrust is imparted to one of the gears tending to move it outwardly, this thrust will be transmitted through the yoke 28 to the other gear 16 tending to move it inwardly so that the arrangement provides a floating mounting for the gears 16 and insures that the total torque load transmitted by them from gear 13 to gear 17 is equally divided between them, and so that tangential reactions of the gears 16 upon the gear 13 are equal and in opposite directions, thereby avoiding a radial thrust upon the projecting end of the shaft 5 that might otherwise be imposed by an unbalanced tangential reaction resulting from the torque load. Thus the gears 16 are mounted for free axial movements radially of the gears 13 and 17 and are consequently yieldable to radial thrusts imposed by the latter as a result of gear tooth reactions therebetween. As shown, the gears 13, 16, and 17 are spiral bevel gears.

A cover plate 33 is secured by bolts 34 to the front side of the housing 10.

I desire it to be understood that this invention is not to be limited to any particular arrangement or construction of parts except in so far as such limitations are included in the claims.

What I claim as my invention is:

1. In a reversible power transmission having a driven shaft and reverse gearing for driving said shaft in reverse including a bevel gear on said shaft, a clutch controlled drive bevel gear and a plurality of radially disposed bevel gears each meshing with said first and second named bevel gears, that improvement which comprises a fixed gear carrier having stud shafts integral therewith on which said radially disposed bevel gears are mounted, and a yoke member having thrust engagement with the outer ends of said bevel gears on said stud shafts and extending over exterior portions of said carrier to automatically equalize the load on said radially disposed bevel gears.

2. In a reversible power transmission, the structure defined in claim 1 in which the carrier has oppositely disposed sets of thrust bearings forming a bearing support for said driven shaft between said first and second named bevel gears.

WALTER P. SCHMITTER.

REFERENCES CITED

The following references are of record in the file of this patent:

UNITED STATES PATENTS

| Number | Name | Date |
|---|---|---|
| 1,888,884 | Omer et al. | Nov. 22, 1932 |
| 1,988,183 | Whitcomb | Jan. 15, 1935 |